US009627891B2

(12) United States Patent
Iwasaki et al.

(10) Patent No.: US 9,627,891 B2
(45) Date of Patent: Apr. 18, 2017

(54) POWER SUPPLY SYSTEM (75) Inventors: Toshiya Iwasaki, Osaka (JP); Atsushi Suyama, Osaka (JP); Atsushi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 454 days.

(21) Appl. No.: 13/695,777

(22) PCT Filed: May 10, 2011

(86) PCT No.: PCT/JP2011/060700
§ 371 (c)(1),
(2), (4) Date: Nov. 1, 2012

(87) PCT Pub. No.: WO2011/142330
PCT Pub. Date: Nov. 17, 2011

(65) Prior Publication Data
US 2013/0049468 A1 Feb. 28, 2013

(30) Foreign Application Priority Data

May 11, 2010 (JP) .................................. 2010-109170

(51) Int. Cl.
H02J 3/38 (2006.01)
H02J 7/35 (2006.01)
H02J 3/00 (2006.01)
(52) U.S. Cl.
CPC ................ *H02J 3/383* (2013.01); *H02J 7/35* (2013.01); *H02J 2003/007* (2013.01);
(Continued)

(58) Field of Classification Search
CPC .. H02J 7/0063; H02J 7/0024; A61N 1/36032; A61N 1/378; H04R 25/606
(Continued)

(56) References Cited

U.S. PATENT DOCUMENTS 5,289,045 A * 2/1994 Lavin .................. H02J 9/062
307/48
6,346,670 B1 2/2002 Fujii et al.
(Continued)

FOREIGN PATENT DOCUMENTS

JP 09-046923 A 2/1997
JP 10-268987 A 10/1998
(Continued)

OTHER PUBLICATIONS

Supplementary European Search Report EP 11 78 0587 dated Nov. 12, 2013.
(Continued)

*Primary Examiner* — Thienvu Tran
*Assistant Examiner* — Brian K Baxter
(74) *Attorney, Agent, or Firm* — McDermott Will & Emery LLP (57) ABSTRACT There is provided a power supply system in which a user can easily determine an optimum method of consuming power obtained by discharging a power storage portion. The power supply system (1) includes: a power storage portion (11) that supplies a power by discharge; a dischargeable time prediction portion (55) that predicts, when a power is supplied to a predetermined load among a plurality of loads included in the load portion (31), a dischargeable time that is a time period in which the power storage portion (11) can perform discharge; and a notification portion (70) that notifies a user of the dischargeable time predicted by the dischargeable time prediction portion (55). The dischargeable time prediction portion (55) predicts a plurality of dischargeable times in which combinations of loads receiving power supply are different and the notification portion (70) notifies the dischargeable times.

9 Claims, 6 Drawing Sheets (52) U.S. Cl.
CPC ........... *Y02E 10/563* (2013.01); *Y02E 10/566* (2013.01); *Y02E 60/76* (2013.01); *Y04S 40/22* (2013.01); *Y10T 307/527* (2015.04)

(58) Field of Classification Search
USPC .......................................................... 307/48
See application file for complete search history.

(56) References Cited

U.S. PATENT DOCUMENTS

| | | | |
|---|---|---|---|
| 6,469,471 B1* | 10/2002 | Anbuky | G01R 31/3624 320/116 |
| 8,543,248 B2* | 9/2013 | Iino | G06Q 10/06 700/291 |
| 8,849,687 B2* | 9/2014 | Hakim | B60L 11/1824 705/7.13 |
| 2001/0020940 A1 | 9/2001 | Nakazato et al. | |
| 2007/0188144 A1 | 8/2007 | Hara et al. | |
| 2008/0040223 A1* | 2/2008 | Bridges | B60L 11/1816 705/14.69 |
| 2008/0281663 A1* | 11/2008 | Hakim | B60L 11/1824 705/7.25 |
| 2009/0037145 A1* | 2/2009 | Suzuki | G01R 31/3679 702/183 |
| 2015/0160672 A1* | 6/2015 | Hakim | B60L 11/1824 700/291 |

FOREIGN PATENT DOCUMENTS

| | | |
|---|---|---|
| JP | 2005-037232 A | 2/2005 |
| JP | 2008-136289 A | 6/2008 |

OTHER PUBLICATIONS

International Search Report mailed Aug. 16, 2011 issued in corresponding International Application No. PCT/JP2011/060700.

\* cited by examiner

| POWER GENERATION AMOUNT PREDICTION METHOD | G1 | G2 | G3 | ... |
|---|---|---|---|---|
| PREDICT BASED ON VALUE ACTUALLY MEASURED BY POWER GENERATION MEASUREMENT PORTION | ○ | — | — | ... |
| PREDICT BASED ON DATABASE | — | ○ | — | ... |
| PREDICT BASED ON VALUE ACTUALLY MEASURED BY POWER GENERATION MEASUREMENT PORTION AND DATABASE | — | — | ○ | ... |

Fig. 4

| LOAD DEMAND AMOUNT PREDICTION METHOD | D1 | D2 | D3 | ... |
|---|---|---|---|---|
| PREDICT BASED ON VALUE ACTUALLY MEASURED BY LOAD MEASUREMENT PORTION | ○ | — | — | ... |
| PREDICT BASED ON DATABASE | — | ○ | — | ... |
| PREDICT BASED ON VALUE ACTUALLY MEASURED BY LOAD MEASUREMENT PORTION AND DATABASE | — | — | ○ | ... |

Fig. 5

| LOAD PATTERN | R1 | R2 | R3 | R4 | R5 | ... |
|---|---|---|---|---|---|---|
| DAYTIME ILLUMINATION | — | — | — | — | — | ... |
| NIGHTTIME ILLUMINATION | ○ | ○ | ○ | ○ | ○ | ... |
| AIR CONDITIONER | — | ○ | — | — | — | ... |
| COOLING DEVICE/ HEATING DEVICE | — | — | ○ | — | — | ... |
| EMERGENCY OUTLET | — | — | — | ○ | — | ... |
| FOOD SUPPLY COOKER | — | — | — | — | ○ | ... |

Fig. 6

IN LOAD PATTERN R1, USABLE FOR A HOURS
IN LOAD PATTERN R2, USABLE FOR B HOURS
IN LOAD PATTERN R3, USABLE FOR C HOURS
IN LOAD PATTERN R4, USABLE FOR D HOURS
IN LOAD PATTERN R5, USABLE FOR E HOURS
⋮
WHEN CURRENT LOAD IS CONTINUED, USABLE FOR X HOURS

POWER SUPPLY SYSTEM

RELATED APPLICATIONS

This application is the U.S. National Phase under 35 U.S.C. §371 of International Application No. PCT/JP2011/060700, filed on May 10, 2011, which in turn claims the benefit of Japanese Application No. 2010-109170, filed on May 11, 2010, the disclosures of which Applications are incorporated by reference herein.

TECHNICAL FIELD

The present invention relates to a power supply system that supplies electric power.

BACKGROUND ART

In recent years, the capacity of storage batteries has been greatly increased, and the utilization of storage batteries for the storage of power consumed in homes, stores, buildings and the like has been examined. In such storage batteries, power is previously stored, and thus the power can be discharged at any time (that is, the power can be supplied). Hence, for example, when system power (power supplied from an electric power company; the same is true in the following description) consumed in, for example, a home, a store or the like is instantaneously increased, the power is supplied by discharge of a storage battery, and can be utilized to reduce the instantaneous consumption of the system power. A storage battery can also be utilized as an emergency power supply source, for example, when the supply of the system power to a home, a store or the like is stopped due to a disaster or the like.

Incidentally, a storage battery cannot discharge power beyond the amount of power stored previously in the storage battery. Hence, when a user discharges a storage battery, it is possible that the storage battery cannot discharge power beyond the expected time.

Hence, for example, patent document 1 discloses a power supply system that predicts, based on a voltage value of a storage battery being discharged, a time in which the storage battery can discharge power, and that displays it. In particular, in this power supply system, based on a time required to reduce the voltage value only by a predetermined magnitude, a method of predicting the time in which the storage battery can discharge power is modified, and thus the time in which the storage battery can discharge power is accurately predicted.

RELATED ART DOCUMENT

Patent Document

Patent document 1: JP-A-2005-37232

SUMMARY OF THE INVENTION

Problems to be Solved by the Invention

With the power supply system proposed in patent document 1, the user can grasp the time in which the storage battery can discharge power. However, even when the user can grasp the time in which the storage battery can discharge power, it is difficult for the user to determine, based on it, an optimum method of consuming power (for example, whether or not the use of various devices (loads) such as an illumination device and an air conditioner is allowed). The optimization of the method of consuming power as described above is necessary when the storage battery is required to be efficiently discharged to supply power, for example, when the system power cannot be used due to a disaster or the like and the storage battery is not expected to be sufficiently charged.

The present invention has an object to provide a power supply system in which a user can easily determine an optimum method of consuming power obtained by discharging a power storage portion.

Means for Solving the Problem

To achieve the above object, according to the present invention, there is provided a power supply system that supplies a power to a load, the power supply system including: a power storage portion that supplies a power by discharge; a dischargeable time prediction portion that predicts, when a power is supplied to a predetermined load, a time period in which the power storage portion can perform discharge; and a notification portion that notifies a user of the dischargeable time predicted by the dischargeable time prediction portion, in which a plurality of the loads are present, the dischargeable time prediction portion predicts a plurality of the dischargeable times in which combinations of loads receiving power supply are different and the notification portion notifies the dischargeable times.

Preferably, the power supply system configured as described above further includes: a remaining capacity measurement portion that measures an amount of power stored in the power storage portion; and a load demand amount prediction portion that predicts an amount of power supplied to the load, in which the dischargeable time prediction portion predicts the dischargeable time based on the amount of power measured by the remaining capacity measurement portion and the amount of power predicted by the load demand amount prediction portion.

In this configuration, the dischargeable time prediction portion can accurately predict the dischargeable time. The dischargeable time prediction portion may predict the dischargeable time by dividing the amount of power measured with the remaining capacity measurement portion by the amount of power predicted with the load demand amount prediction portion.

Preferably, the power supply system configured as described above further includes: a load measurement portion that measures the power or a current supplied to the load; and a database that records information on the power or the current measured by the load measurement portion, in which the load demand amount prediction portion predicts the amount of power supplied to the load based on at least one of the power or the current measured by the load measurement portion and the information, recorded in the database, on the power or the current supplied to the load.

In this configuration, the load demand amount prediction portion can accurately predict the amount of power supplied to the load. When the load demand amount prediction portion predicts the amount of power supplied to the load based on the information, recorded in the database, on the power or the current supplied to the load, information on the power or the current measured by the load measurement portion under the same conditions as at the time of the prediction may be selectively used.

Preferably, the power supply system configured as described above further includes: a power generation portion that supplies a power by power generation; and a power generation amount prediction portion that predicts an amount of power supplied by the power generation portion, in which the dischargeable time prediction portion predicts the dischargeable time based on the amount of power measured by the remaining capacity measurement portion, the amount of power predicted by the power generation amount prediction portion and the amount of power predicted by the load demand amount prediction portion.

In this configuration, the dischargeable time prediction portion predicts the dischargeable time of the power storage portion in consideration of the amount of power supplied by the power generation portion. Hence, the dischargeable time prediction portion can accurately predict the dischargeable time. The dischargeable time prediction portion may predict the dischargeable time by dividing, by the amount of power predicted with the load demand amount prediction portion, what is obtained by adding the amount of power predicted with the power generation amount prediction portion to the amount of power measured with the remaining capacity measurement portion.

Preferably, the power supply system configured as described above further includes: a power generation measurement portion that measures the power or a current supplied by the power generation portion; and a database that records information on the power or the current measured by the power generation measurement portion, in which the power generation amount prediction portion predicts the amount of power supplied by the power generation portion based on at least one of the power or the current measured by the power generation measurement portion and the information, recorded in the database, on the power or the current supplied by the power generation portion.

In this configuration, the power generation measurement portion can accurately predict the amount of power supplied by the power generation portion. When the power generation measurement portion predicts the amount of power supplied by the power generation portion based on the information, recorded in the database, on the power or the current supplied by the power generation portion, information on the power or the current measured by the power generation measurement portion under the same conditions as at the time of the prediction may be selectively used.

Preferably, in the power supply system configured as described above, a system power supplied from an electric power company can be supplied to the power supply system, a power generation portion that supplies a power by power generation is further included, and, when the supply of the system power is stopped, at least one of a power supplied by discharge of the power storage portion and a power supplied by power generation with the power generation portion is supplied to the load.

In this configuration, when the system power cannot be used and power cannot be expected to be sufficiently stored in the power storage portion at the time of a disaster or the like where the supply of the system power is stopped, it is possible to efficiently discharge the power storage portion and to supply power.

Effects of the Invention

In the configuration of the present invention, the user is notified of the dischargeable times by the notification portion, and thus the user can easily grasp how long the power storage portion is discharged to supply power when power is supplied to a specific load. Hence, the user can easily determine the optimum method of consuming power obtained by discharging the power storage portion.

The significance and effects of the present invention will be more obvious from the description of an embodiment indicated below. However, the embodiment below is simply one embodiment of the present invention; the present invention and the significance of the terms of constituent requirements are not limited to what is described in the embodiment below.

DESCRIPTION OF EMBODIMENTS

A power supply system according to an embodiment of the present invention will be described below with reference to drawings.

<<Configuration of the Power Supply System>>

Figure 1:
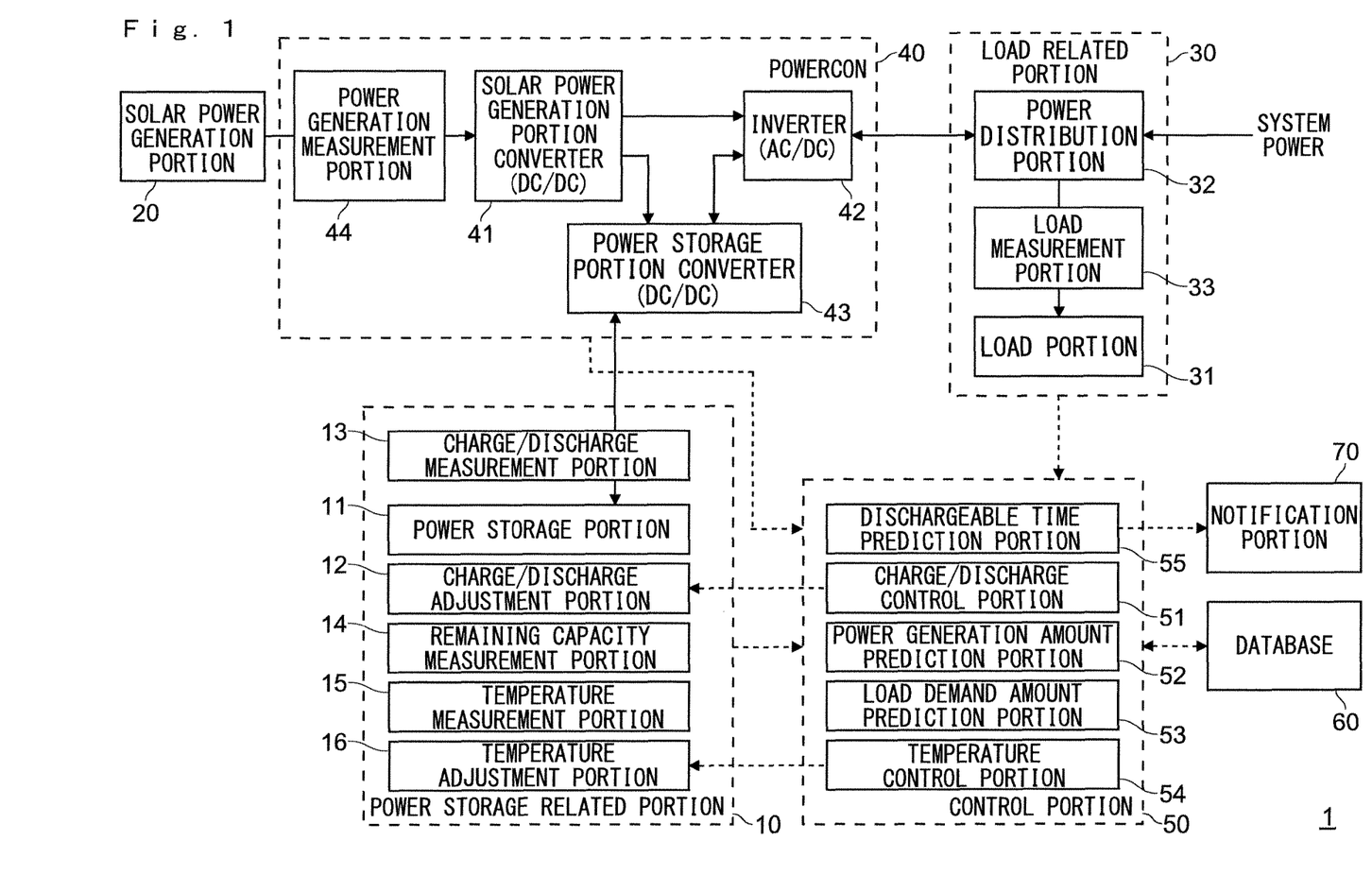
FIG. 1 A block diagram showing an example of the configuration of a power supply system according to an embodiment of the present invention.

An example of the configuration of the power supply system according to the embodiment of the present invention will first be described with reference to the drawings. FIG. 1 is a block diagram showing the example of the configuration of the power supply system according to the embodiment of the present invention. In the figure, solid line arrows connecting the blocks of the figure represent the exchange of power and broken line arrows represent the exchange of information.

The power supply system 1 shown in FIG. 1 includes: a power storage related portion 10 that includes a power storage portion 11 which stores supplied power and which supplies the power by discharge; a solar power generation portion 20 that supplies power by solar power generation; a load related portion 30 that includes a load portion 31 which consumes power; a power conditioner (hereinafter referred to as a powercon) 40 that adjusts the exchange of power; a control portion 50 that controls the operations of individual portions; a database 60 that records various types of information which can be acquired by the control portion 50; and a notification portion 70 that is controlled by the control portion 50 and that provides a notification to a user.

The power storage related portion 10 includes: the power storage portion 11; a charge/discharge adjustment portion 12 that charges and discharges the power storage portion 11; a charge/discharge measurement portion 13 that measures a power or a current stored in the power storage portion 11 and a power or a current discharged from the power storage portion 11; a remaining capacity measurement portion 14 that measures the amount of power stored in the power storage portion 11; a temperature measurement portion 15 that measures the temperature of a space (hereinafter referred to as a power storage portion installation space) where the power storage portion 11 is installed; and a temperature adjustment portion 16 that adjusts the temperature of the power storage portion installation space.

The power storage portion 11 is formed with, for example, a large capacity storage battery and is charged and discharged by the charge/discharge adjustment portion 12. The charge/discharge measurement portion 13 measures, for example, the amount of power or the amount of current stored in the power storage portion 11 per unit time (for example, one minute) and the amount of power or the amount of current discharged from the power storage portion 11 per unit time. The remaining capacity measurement portion 14 has, for example, a table showing the relationship between the voltage value of the power storage portion 11 and the amount of power stored in the power storage portion 11, measures the voltage value of the power storage portion 11, references the table and thereby measures the amount of power stored in the power storage portion 11. For example, with reference to the state of the full charge and the full discharge of the power storage portion 11, the remaining capacity measurement portion 14 adds (at the time of charge) or subtracts (at the time of discharge) the integral value of the power or the current measured by the charge/discharge measurement portion 13, and thereby measures the amount of power stored in the power storage portion 11.

The temperature measurement portion 15 is formed with a temperature sensor such as a thermistor or a thermocouple, and measures the temperature of the power storage portion installation space. The power storage portion installation space may be a space common to all or part of the space within a building such as a store, or may be a space separate from the other space within the building or a space outside the building. The temperature adjustment portion 16 is formed with a device, such as an air-cooled fan or an air conditioner (hereinafter referred to as an aircon), that can adjust a temperature; the temperature adjustment portion 16 is not limited to a device, such as an air-cooled fan or an air conditioner (cooling), that decreases the temperature and can include a device, such as an aircon (heating), a solar heat system or a discharged-heat utilization system, that increases the temperature. The temperature measurement portion 15 may measure, in addition to (instead of) the temperature of the power storage portion installation space, the temperature of the power storage portion 11. The temperature adjustment portion 16 may adjust, in addition to (instead of) the temperature of the power storage portion installation space, the temperature of the power storage portion 11.

Pieces of information (hereinafter referred to as charge/discharge information, remaining capacity information and temperature information) obtained by measuring the charge/discharge measurement portion 13, the remaining capacity measurement portion 14 and the temperature measurement portion 15 are input into the control portion 50. The charge/discharge adjustment portion 12, the charge/discharge measurement portion 13, the remaining capacity measurement portion 14, the temperature measurement portion 15 and the temperature adjustment portion 16 can be included in the load portion 31, which will be described later (can consume power).

The solar power generation portion 20 is formed with, for example, a solar power generation panel that is installed outdoor, and generates power by converting applied light (sunlight) into power.

The load related portion 30 includes: the load portion 31; a power distribution portion 32 that supplies, as necessary, supplied power to the load portion 31; and a load measurement portion 33 that measures a power or a current which is supplied to loads of the load portion 31.

The load portion 31 is formed with a plurality of devices (loads) that consume the supplied power. The load portion 31 can include, for example, an illumination device such as an electric light, an air conditioner, a cooling device and a heating device and an EV charge device that charges a storage battery (battery) for driving an electric vehicle. Even the same devices are treated as different loads depending on the aspect of usage. For example, in an illumination device, night-time illumination and daytime illumination are regarded as different loads. The power distribution portion 32 selectively supplies power (hereinafter referred to as a system power) supplied from an electric power company and a power supplied from the powercon 40 to the loads of the load portion 31. The load measurement portion 33 measures, for each load, the amount of power or the amount of current per unit time (for example, one minute) supplied to a plurality of loads of the load portion 31. One load measurement portion 33 may measure the amount of power or the amount of current per unit time supplied to the individual loads or a plurality of load measurement portions 33 may measure the amount of power or the amount of current per unit time supplied to the corresponding loads. The load measurement portion 33 may measure the total of the amounts of power or the amounts of current per unit time supplied to a plurality of (for example, all) loads or may measure the total of the amounts of power or the amounts of current per unit time supplied to the loads of a predetermined load group (for example, an illumination device group of devices, such as an electric light, that convert electric power into light or a power device group, such as an air conditioner, that converts electric power into power).

Information (hereinafter referred to as load demand amount information) obtained by measurement with the load measurement portion 33 is input into the control portion 50. The load measurement portion 33 can be included in the load portion 31 (can consume power).

The powercon 40 includes: a solar power generation portion converter 41 that converts an input direct-current power into a predetermined direct-current power and that outputs it; an inverter 42 that coverts an input alternating-current power or direct-current power into a predetermined direct-current power or alternating-current power and that outputs it; a power storage portion converter 43 that converts an input direct-current power into a predetermined direct-current power and that outputs it; a power generation measurement portion 44 that measures a power or a current supplied by the power generation with the solar power generation portion 20.

The solar power generation portion converter 41 converts a direct-current power supplied by the solar power generation portion 20 into a direct-current power suitable for processing by the inverter 42 or the power storage portion converter 43, and outputs it. The inverter 42 converts an alternating-current system power input through the power distribution portion 32 into a direct-current power suitable for processing by the power storage portion converter 43, and outputs it. The inverter 42 also converts a direct-current power output from the solar power generation portion converter 41 or a direct-current power output from the power storage portion converter 43 into an alternating-current power suitable for processing by the power distribution portion 32 or the load portion 31, and outputs it to the power distribution portion 32. The power storage portion converter 43 converts a direct-current power output from the solar power generation portion converter 41 or a direct-current power output from the inverter 42 into a direct-current power suitable for charge by the power storage portion 11, and outputs it to the power storage portion 11. The power storage portion converter 43 also converts a direct-current power supplied by discharge of the power storage portion 11 into a direct-current power suitable for processing by the inverter 42, and outputs it. The power generation measurement portion 44 measures the amount of power or the amount of current per unit time (for example, one minute) that is the direct-current power output from the solar power generation portion 20 and input into the solar power generation portion converter 41.

Information (hereinafter referred to as power generation amount information) obtained by measurement with the power generation measurement portion 44 is input into the control portion 50. The solar power generation portion converter 41, the inverter 42, the power storage portion converter 43 and the power generation measurement portion 44 can be included in the load portion 31 (can consume power).

The control portion 50 includes: a charge/discharge control portion 51 that controls the operation of the charge/discharge adjustment portion 12; a power generation amount prediction portion 52 that predicts the amount of power generated by the solar power generation portion 20; a load demand amount prediction portion 53 that predicts the amount of power consumed by the load portion 31; a temperature control portion 54 that controls the operation of the temperature adjustment portion 16; and a dischargeable time prediction portion 55 that predicts the dischargeable time of the power storage portion 11. Part or all of the control portion 50 may be installed into the powercon 40 or may be installed independently of the powercon 40.

The control portion 50 records, as necessary, the various types of information acquired as described above in the database 60. The control portion 50 reads, as necessary, information recorded in the database 60. The database 60 may be formed such that the database 60 can record each piece of information generated by another power supply system.

The charge/discharge control portion 51 controls the charge/discharge adjustment portion 12 based on the amount of power (hereinafter referred to as a power generation amount) that is predicted by the power generation amount prediction portion 52 and that is generated by the solar power generation portion 20 and the amount of power (load demand amount) that is predicted by the load demand amount prediction portion 53 and that is consumed by the load portion 31. In this way, according to a predetermined policy (for example, a policy for reducing the consumption of the system power to decrease an electric power charge), the charge and discharge of the power storage portion 11 are performed. The power generation amount prediction portion 52 and the load demand amount prediction portion 53 can reference not only the power generation amount information and the load demand amount information acquired at the time of the prediction but also information recorded in the database 60 (for example, the power generation amount information and the load demand amount information acquired and recorded in the past and information obtained by statistically performing processing (for example, averaging for a predetermined period such as a week or a month) on them; hereinafter referred to as the past power generation amount information and the past load demand amount information) (the details of which will be described later).

Based on, for example, the temperature information, the charge/discharge information and the load demand amount information, the temperature control portion 54 recognizes the current temperature of or variations in the future temperature of the power storage portion 11 (in particular, the increase in the temperature), and controls the operation of the temperature adjustment portion 16. Thus, it is possible to change the temperature of the power storage portion installation space to a temperature suitable for the operation of the power storage portion 11.

Based on, for example, the remaining capacity information and the results predicted by the power generation amount prediction portion 52 and the load demand amount prediction portion 53, the dischargeable time prediction portion 55 predicts a time in which the power storage portion 11 can discharge power. The dischargeable time prediction portion 55 inputs information (hereinafter referred to as the dischargeable time information) indicating the predicted time into the notification portion 70, and makes the notification portion 70 provide a notification of it. For example, the notification portion 70 displays a character or an image or produces a sound, and thereby notifies the user of the dischargeable time information (the details of which will be described later).

The charge/discharge control portion 51, the power generation amount prediction portion 52, the load demand amount prediction portion 53, the temperature control portion 54, the dischargeable time prediction portion 55, the database 60 and the notification portion 70 can be included in the load portion 31 (can consume power).

The configuration of the power supply system 1 shown in FIG. 1 is simply an example; another configuration may be used. For example, instead of the inverter 42, both a solar power generation portion inverter that converts a direct-current power output from the solar power generation portion converter 41 into an alternating-current power and that inputs it into the power distribution portion 32 and a power storage portion converter that converts a direct-current power output from the power storage portion converter 43 into an alternating-current power and inputs it into the power distribution portion 32 and that converts an alternating-current power input through the power distribution portion 32 into a direct-current power and inputs it into the power storage portion converter 43 may be included. Furthermore, instead of the power storage portion converter, a discharge inverter that converts a direct-current power output from the power storage portion converter 43 into an alternating-current power and that inputs it into the power distribution portion 32 and a power storage converter that converts an alternating-current power input through the power distribution portion 32 into a direct-current power and that inputs it into the power storage portion converter 43 may be included.

The relationship of inclusion of the individual blocks is only used for ease of description; another relationship may be used instead. For example, the charge/discharge measurement portion 13 and the charge/discharge adjustment portion 12 may be included in the powercon 40 (may not be included in the power storage related portion 10). Moreover, for example, the power storage portion converter 43 may be included in the power storage related portion 10 (may not be included in the powercon 40). The power generation measurement portion 44 may be included in the side of the solar power generation portion 20 (may not be included in the powercon 40).

Although, in the configuration described above, the power supplied by the power storage portion 11 is supplied to the load portion 31 through the powercon 40 and the power distribution portion 32, the power supplied by the power storage portion 11 may be directly supplied to the load portion 31 depending on the conditions. As a specific configuration, for example, a power failure detection portion that detects the stop of the supply of the system power and a switching portion that switches the destination of the power of the power storage portion 11 between the powercon 40 and the load portion 31 may be included. The switching portion may switch the destination of the power of the power storage portion 11 from the powercon 40 to the load portion 31 by the detection of the stop of the supply of the system power by the power failure detection portion.

When the power failure detection portion described above is included, and the power failure detection portion detects the stop of the supply of the system power, the dischargeable time prediction portion 55 of the control portion 50 and the notification portion 70 may automatically start the operation. Furthermore, a predetermined load (for example, an illumination device) may be automatically operated. The start of the operation of the dischargeable time prediction portion 55 and the notification portion 70 may be indicated by the user.

The control portion 50 may acquire, through a network or the like, information (for example, the presence of sunlight, the ambient temperature, the humidity or the rainfall) on the current or future weather; an observation device for generating information on the weather may be provided, and information from the observation device on the weather may be acquired. The control portion 50 may record the acquired information on the weather in the database 60. The control portion 50 may also generate information on time or acquire it from the outside, and may record the generated or acquired information on time in the database 60. With this configuration, the power generation amount prediction portion 52 and the load demand amount prediction portion 53 can also perform prediction based on the weather or the time. Thus, it is possible to further accurately perform prediction.

Instead of (or in addition to) the solar power generation portion 20 that supplies power by solar power generation, a power generation portion (for example, a fuel battery or a generator) that supplies power in another method may be provided.

<<An Operation of Predicting the Dischargeable Time and a Notification Operation>>

Figure 2:
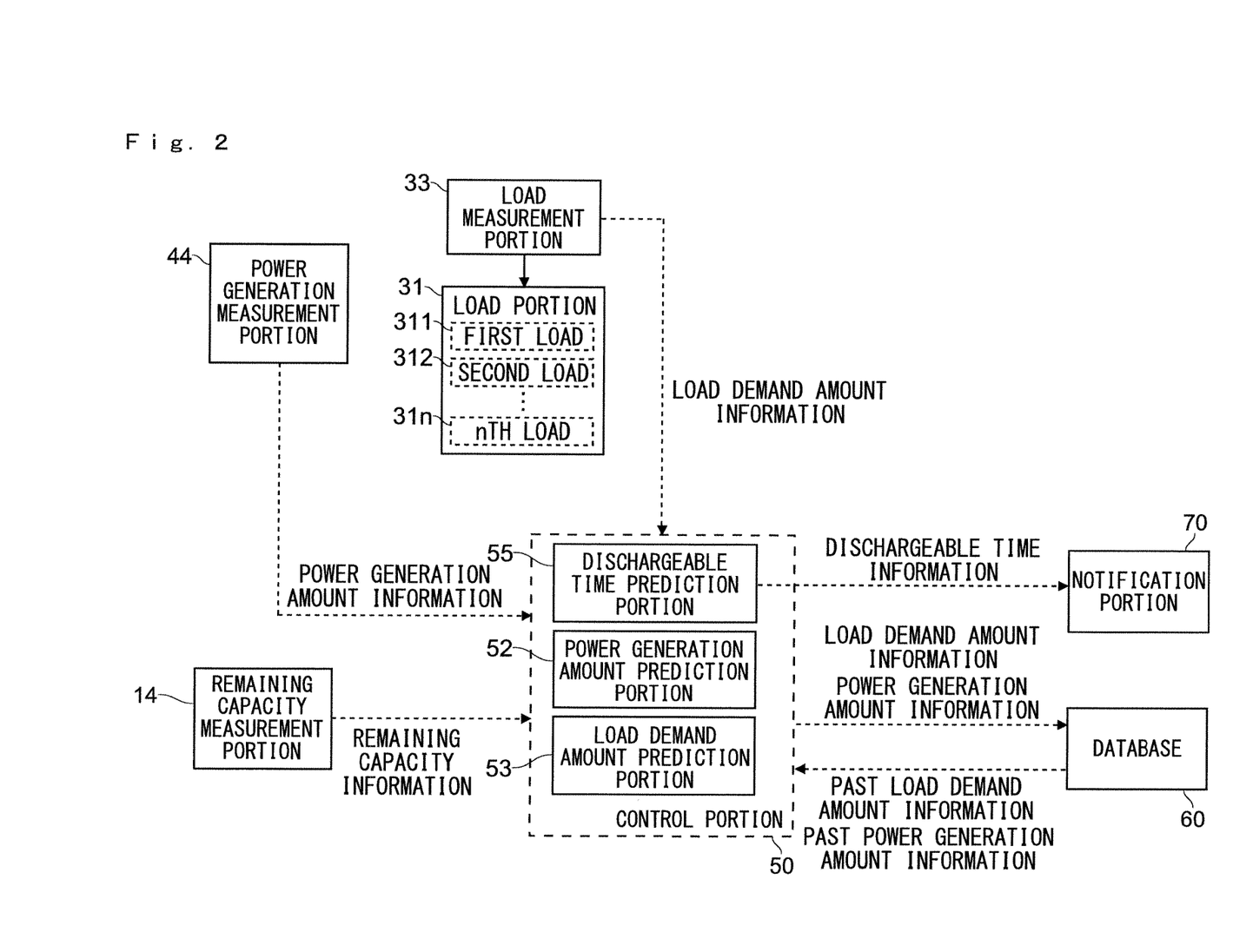
FIG. 2 A block diagram showing the main portions of the power supply system shown in FIG. 1.

An example of an operation of predicting the dischargeable time and a notification operation in the power supply system shown in FIG. 1 will be described with reference to drawings. FIG. 2 is a block diagram showing the main portions of the power supply system shown in FIG. 1, and shows, in the block diagram shown in FIG. 1, portions related to the operation of predicting the dischargeable time and the notification operation. As in FIG. 1, solid line arrows connecting the blocks of the FIG. 2 represent the exchange of power and broken line arrows represent the exchange of information. A case where the supply of the system power is stopped due to a disaster or the like will be described below.

(Power Generation Amount Prediction Portion)

Figure 3:
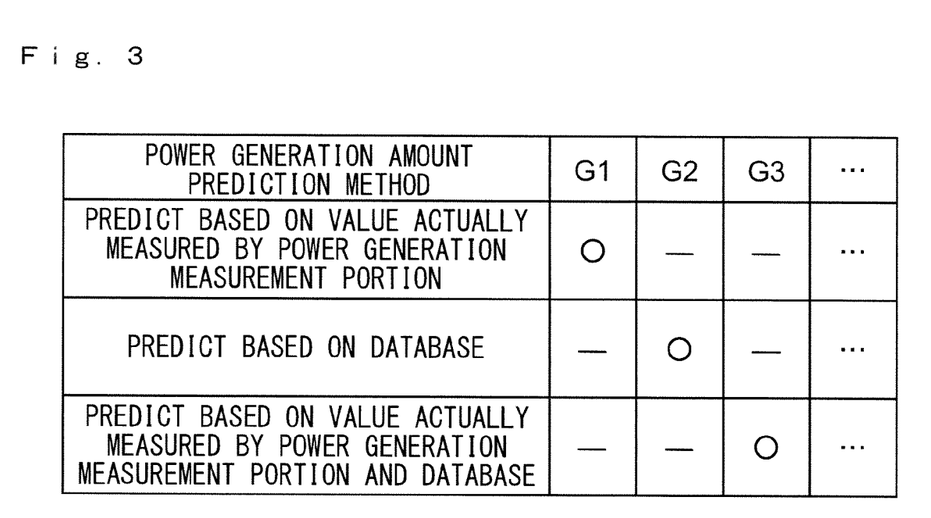
FIG. 3 A graph illustrating a method of predicting a power generation amount.

A method of performing prediction by the power generation amount prediction portion 52 of the control portion 50 will first be described with reference to FIGS. 2 and 3. FIG. 3 is a graph illustrating a method of predicting the power generation amount. As described above, the power generation amount prediction portion 52 can acquire the power generation amount information from the power generation measurement portion 44 and the past power generation amount information from the database 60.

The power generation amount prediction portion 52 can predict the power generation amount based on the power generation amount information (that is, a value which is actually measured by the power generation measurement portion 44) obtained at the time of the prediction (power generation amount prediction method G1). For example, based on the power generation amount information obtained at the time of the prediction and conditions (for example, the weather, the season and the time) at the time of the prediction, subsequent variations in the power generation amount are predicted.

The power generation amount prediction portion 52 can predict the power generation amount based on the past power generation amount information acquired from the database 60 (power generation amount prediction method G2). For example, the prediction of the power generation amount is performed by selectively referencing conditions (for example, the weather, the season, the day, the date, the time, the area, the size of the power supply system 1 (in particular, the solar power generation portion 20) and the size of a store or the like having the power supply system 1) at the time of the prediction and the past power generation amount information obtained under the similar conditions.

The power generation amount prediction portion 52 can predict the power generation amount based on the power generation amount information obtained at the time of the prediction and the past power generation amount information acquired from the database 60 (power generation amount prediction method G3). For example, the prediction of the power generation amount is performed by averaging the power generation amount predicted with the power generation amount prediction method G1 and the power generation amount predicted with the power generation amount prediction method G2.

The power generation amount prediction portion 52 may use a method other than the power generation amount prediction methods G1 to G3 to predict the power generation amount. The user may select an arbitrary power generation amount prediction method; the power generation amount prediction portion 52 may perform only a certain power generation amount prediction method.

(Load Demand Amount Prediction Portion)

Figure 4:
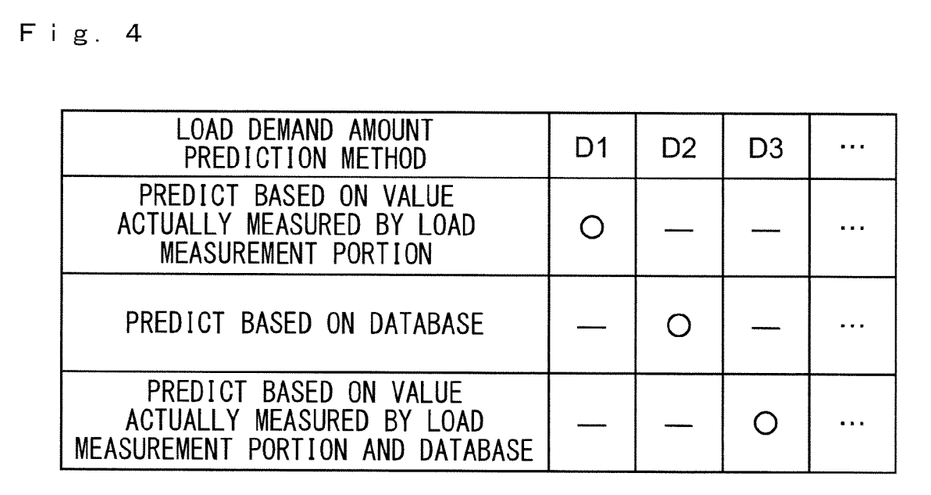
FIG. 4 A graph illustrating a method of predicting a load demand amount

A method of performing prediction by the load demand amount prediction portion 53 of the control portion 50 will now be described with reference to FIGS. 2 and 4. FIG. 4 is a graph illustrating a method of predicting the load demand amount. As described above, the load demand amount prediction portion 53 can acquire the load demand amount information from the load measurement portion 33 and the past load demand amount information from the database 60.

The load demand amount prediction portion 53 can predict the load demand amount based on the load demand amount information (that is, a value which is actually measured by the load measurement portion 33) obtained at the time of the prediction (load demand amount prediction method D1). For example, based on the load demand amount information obtained at the time of the prediction and conditions (for example, the weather, the season, the date and the time) at the time of the prediction, subsequent variations in the load demand amount are predicted.

The load demand amount prediction portion 53 can predict the load demand amount based on the past load demand amount information acquired from the database 60 (load demand amount prediction method D2). For example, the prediction of the load demand amount is performed by selectively referencing conditions (for example, the weather, the season, the day, the date, the time, the area, the size of the power supply system 1 (in particular, the load portion 31) and the size of a store or the like having the power supply system 1) at the time of the prediction and the past load demand amount information obtained under the similar conditions.

The load demand amount prediction portion 53 can predict the load demand amount based on the load demand amount information obtained at the time of the prediction and the past load demand amount information acquired from the database 60 (load demand amount prediction method D3). For example, the load demand amount is predicted by averaging the load demand amount predicted with the load demand amount prediction method D1 and the load demand amount predicted with the load demand amount prediction method D2.

The load demand amount prediction portion 53 may use a method other than the load demand amount prediction methods D1 to D3 to predict the load demand amount. The user may select an arbitrary load demand amount prediction method; the load demand amount prediction portion 53 may perform only a certain load demand amount prediction method.

For each load, the load demand amount prediction method to be applied may be selected from the load demand amount prediction methods D1 to D3. For example, if the load demand amount prediction portion 53 can acquire the load demand amount information on a certain load, the load demand amount prediction method D1 may be applied to perform prediction for the certain load whereas, if the load demand amount prediction portion 53 cannot acquire the load demand amount information on a certain load, the load demand amount prediction method D2 may be applied to perform prediction for the certain load.

(Dischargeable Time Prediction Portion)

Figure 5:
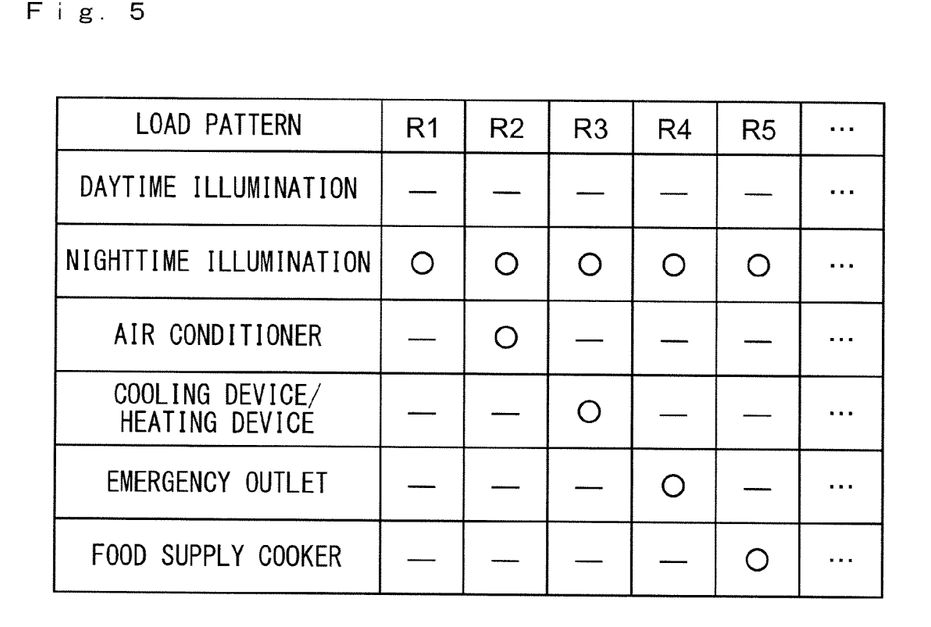
FIG. 5 A graph showing an example of a load pattern that can be selected.

A method of performing prediction by the dischargeable time prediction portion 55 of the control portion 50 will be described with reference to FIGS. 2 and 5. FIG. 5 is a graph showing an example of a load pattern that can be selected.

As shown in FIG. 2, the load portion 31 includes a plurality of loads (a first load 311, a second load 312, . . . and the nth load 31$n$; n is an integer of two or more). Hence, as shown in FIG. 5, there can be a plurality of combinations (load patterns that can be selected) of loads to which the user can supply (can use) power. As shown in FIG. 5, loads which are of the same type and in which usage conditions are different may be regarded as different loads (for example, daytime illumination and nighttime illumination). The loads and the load patterns R1 to R5 shown in FIG. 5 are simply an example; another load and another load pattern may be included or any of them may be omitted.

The dischargeable time prediction portion 55 predicts the dischargeable time on the load patterns R1 to R5. The dischargeable time is one that indicates, for example, when power is supplied to loads (loads represented by round marks in FIG. 5) shown in the load patterns R1 to R5, a time (in other words, a time in which power can be supplied to the load) in which the power storage portion 11 can perform discharge. The dischargeable time prediction portion 55 may predict the dischargeable time on a combination of loads (the current load pattern; which can be regarded as one of the load patterns) that supplies power at the time of the prediction.

Specifically, for example, the dischargeable time prediction portion 55 can calculate the dischargeable time according to the following formula (1). In the following formula (1), it is assumed that the dischargeable time is T (hour), the amount of power measured by the remaining capacity measurement portion 14 and stored in the power storage portion 11 is A (kWh), the load demand amount per minute predicted by the load demand amount prediction portion 53 is BkW minute (that is, 60 BkWh) and the amount of power generated per minute predicted by the power generation amount prediction portion 52 is CkW minute (that is 60 CkWh). Although, for ease of description, in the following formula (1), the load demand amount B and the power generation amount C are not functions of time (do not change with time), they may be functions of time (change with time). The load demand amount B may include the amount of power of the load (for example, the control portion 50 or the notification portion 70) necessary to maintain the operation of the power supply system 1. In the nighttime or in the event of rain, the power generation amount C approaches zero.

$$T=(A+60C)/60B \qquad (1)$$

Figure 6:
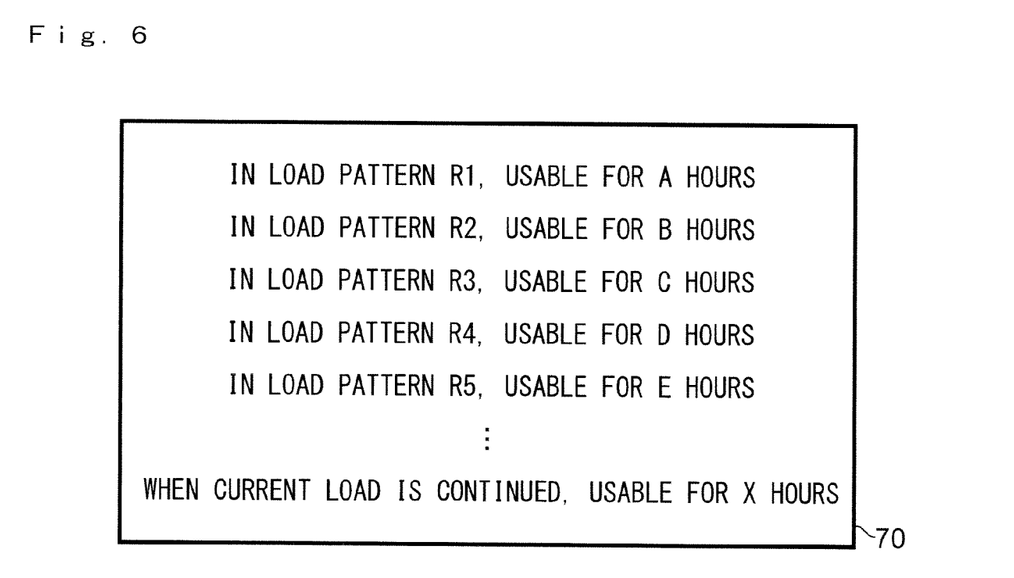
FIG. 6 A diagram showing an example of notification (an example of display) by a notification portion when the load patterns shown in FIG. 5 can be selected.

For example, the dischargeable time predicted according to the above formula (1) is notified by the notification portion 70. An example of notification (an example of display) when the notification portion 70 is a display device will be described with reference to FIG. 6. FIG. 6 is a diagram showing an example of notification (an example of display) by the notification portion when the load patterns shown in FIG. 5 can be selected.

As shown in FIG. 6, the notification portion 70 notifies (displays) the user of dischargeable times corresponding to the load patterns R1 to R5 and the current load pattern. Although FIG. 6 shows a case where the dischargeable times corresponding to a plurality of load patterns are displayed simultaneously, the dischargeable times may be sequentially displayed according to the instruction of the user, the lapse of time or the like.

In the configuration described above, the user is notified of the dischargeable times by the notification portion 70, and thus the user can easily grasp how long the power storage portion 11 is discharged to supply power when power is supplied to a specific load. Hence, the user can easily determine the optimum method of consuming power obtained by discharging the power storage portion 11.

Specifically, for example, when the user desires that "if the amount of power stored in the power storage portion 11 is sufficient while nighttime illumination is being used, another load is used," the user checks only a "load pattern in which nighttime illumination is used and the dischargeable time exceeds a desired time (morning)," and thus it is possible to easily determine an appropriate combination (load pattern) of loads to be used.

<<Variation 1>>

In the power supply system 1 according to the embodiment of the present invention, part or all of the operation of the control portion 50 and the like may be performed by a control device such as a microcomputer. Furthermore, all or part of the function realized by such a control device is described as a program, and the program is executed on a program execution device (for example, a computer), with the result that all or part of the function may be executed.

In addition to the cases described above, the power supply system 1 shown in FIGS. 1 and 2 can be realized by hardware or a combination of hardware and software. When part of the charging system is configured with software, the block of a portion realized by software represents the functional block of the portion.

<<Variation 2>>

Figure 7:
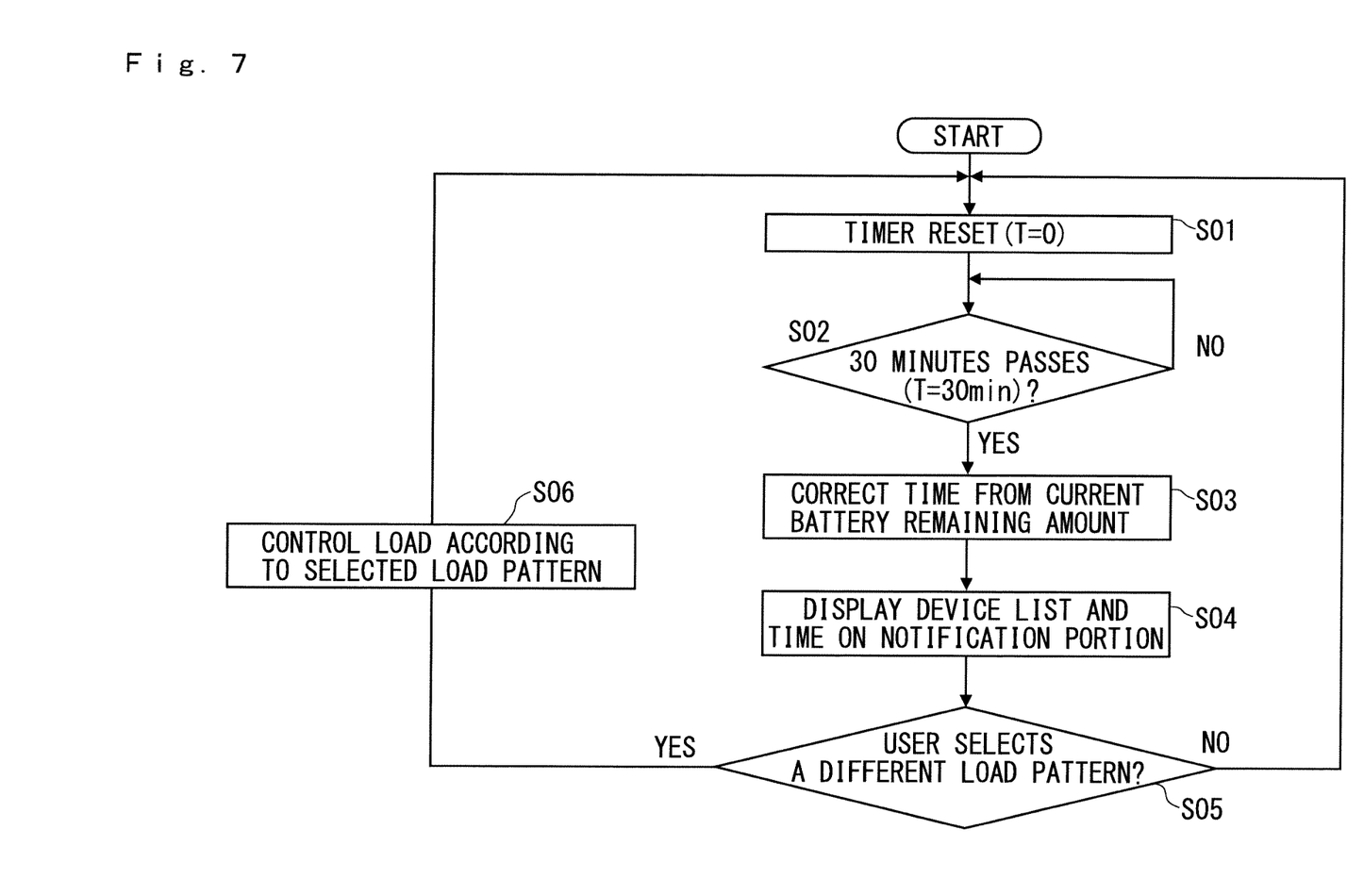
FIG. 7 A control flow of a control portion according to a variation of the present invention.

In this variation, the prediction of the dischargeable time is repeated at predetermined intervals, and the dischargeable time corresponding to the combination of loads is updated, and thus it is possible to cope with variations produced when an actual load is used. For example, a time in which discharge can be performed when a load displayed in a list is used based on the current storage battery remaining amount is calculated ever thirty minutes and is redisplayed.

Specifically, the control portion performs control shown in the flowchart of FIG. 7; every time thirty minutes passes using a timer 57 (S01), how much hours it can still be used when the combination of loads displayed in the list is used based on the remaining storage battery amount at that time is calculated and displayed (S03 and S04)

<<Variation 3>>

In this variation, the combinations of loads that can be used in an input time are displayed.

For example, when the user wants to know what loads can be used in the remaining three hours, if the user inputs three hours through input means which is a touch panel or a key, the combinations of loads that can be used for three hours or more (at least three hours) based on the current amount of power and power generation prediction are displayed.

When the user wants to know what load combination can be used until a specific time, a time period from the current time to the specific time may be calculated and set at the input time period; furthermore, if the time when an electric power company performs a power stoppage is previously known, a time period from the current time to the time when the power stoppage is performed may be calculated and set at the input time period.

<<Variation 4>>

Figure 8:
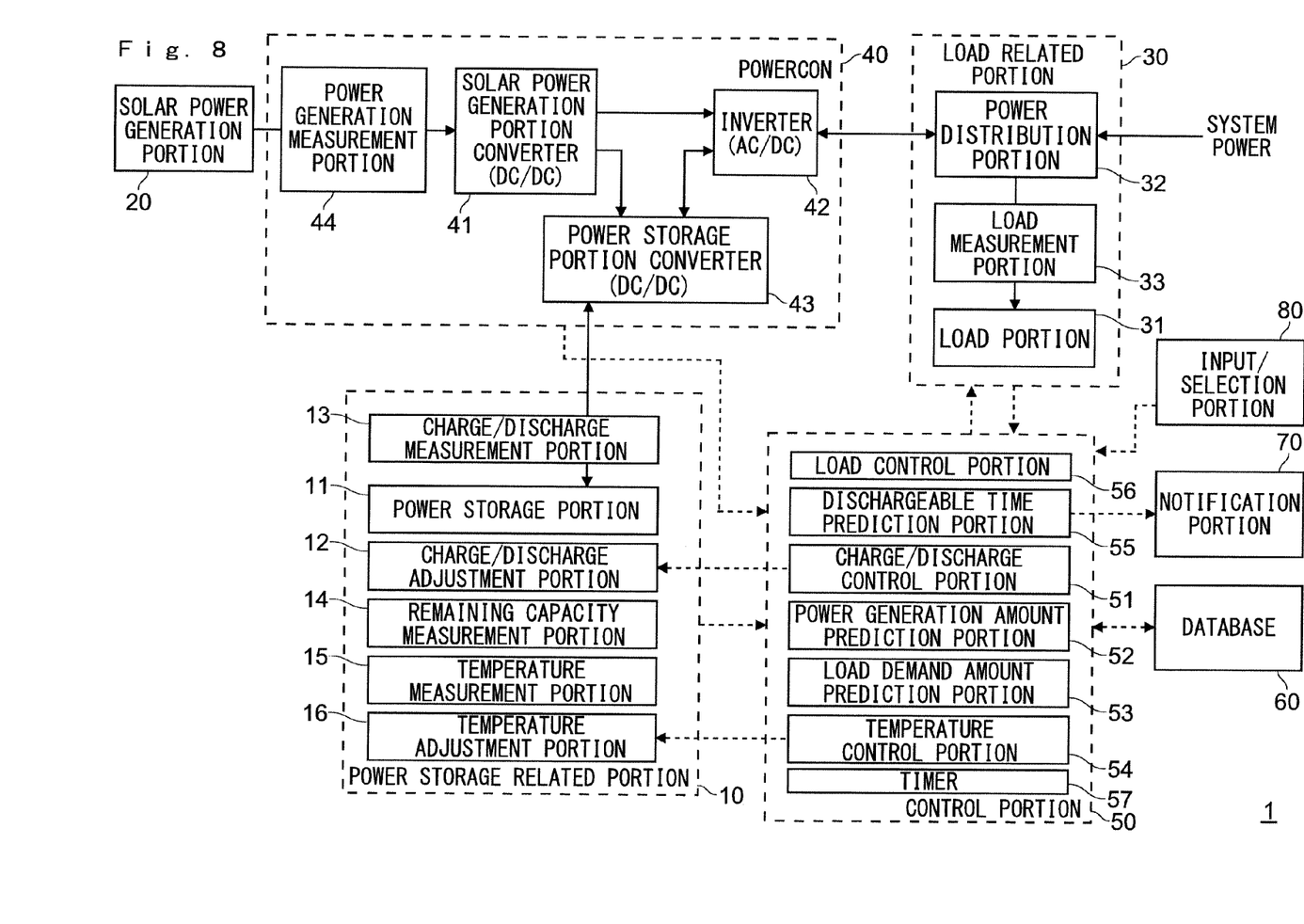
FIG. 8 A block diagram showing an example of the configuration of a power supply system according to a variation of the present invention.

In this variation, the user selects one load pattern (combination) from a plurality of combinations of loads displayed on display means, and individual devices are controlled according to the selected load pattern. As shown in FIG. 8, in the control portion 50, a selection portion (80) that selects a load pattern and a load control portion (56) that controls the load portion are further provided, and the individual devices are controlled based on the load pattern selected by the user. Specifically, a table between loads and times is referenced to control the intensity of an illumination device and to control the temperature of an air conditioner or the like and turn on and off it. When these devices can be operated with an infrared remote controller, control may be performed by outputting an infrared signal, and an electric switchboard may be controlled for each load to control the turning on and off of each device.

Although the embodiment of the present invention has been described above, the scope of the present invention is not limited to this embodiment; various modifications are possible without departing from the spirit of the present invention.

INDUSTRIAL APPLICABILITY

The present invention can be utilized for a power supply system that supplies electric power.

LIST OF REFERENCE SYMBOLS

1 power supply system
11 power storage portion
13 charge/discharge measurement portion
14 remaining capacity measurement portion
20 solar power generation portion
31 load portion
33 load measurement portion
44 power generation measurement portion
50 control portion
51 charge/discharge control portion
52 power generation amount prediction portion
53 load demand amount prediction portion
55 dischargeable time prediction portion
60 database
70 notification portion
80 input/selection portion

The invention claimed is:

1. A power supply system comprising:
   loads each including one or more devices configured to consume power to be supplied, but having no power generation and storage capability; and
   a power storage portion that stores the power to be supplied to one of the loads;
   a dischargeable time prediction portion that predicts dischargeable times for the loads, respectively, each predicted dischargeable time indicating how long the power storage portion is capable of supplying the stored power to corresponding one of the loads;
   a notification portion that notifies a user of the dischargeable times predicted by the dischargeable time prediction portion;
   a remaining capacity measurement portion that measures an amount of power stored in the power storage portion;
   a load demand amount prediction portion that predicts an amount of power supplied to each load,
   a power generation portion that supplies a power by power generation; and
   a power generation amount prediction portion that predicts an amount of power supplied by the power generation portion,
   wherein the dischargeable time prediction portion predicts the dischargeable time based on the amount of power measured by the remaining capacity measurement portion, the amount of power predicted by the power generation amount prediction portion and the amount of power predicted by the load demand amount prediction portion.

2. The power supply system of claim 1 further comprising:
   a load measurement portion that measures the power or a current supplied to each load; and
   a database that records information on the power or the current measured by the load measurement portion,
   wherein the load demand amount prediction portion predicts the amount of power supplied to each load based on at least one of the power or the current measured by the load measurement portion and the information, recorded in the database, on the power or the current supplied to each load.

3. The power supply system of claim 1 further comprising:
   a power generation measurement portion that measures the power or a current supplied by the power generation portion; and
   a database that records information on the power or the current measured by the power generation measurement portion,
   wherein the power generation amount prediction portion predicts the amount of power supplied by the power generation portion based on at least one of the power or the current measured by the power generation measurement portion and the information, recorded in the database, on the power or the current supplied by the power generation portion.

4. The power supply system of claim 1, wherein a system power supplied from an electric power company can be supplied to the power supply system,
a power generation portion that supplies a power by power generation is further included, and
when the supply of the system power is stopped, at least one of a power supplied by discharge of the power storage portion and a power supplied by power generation with the power generation portion is supplied to the one of the loads.

5. The power supply system of claim 1, wherein the prediction of the dischargeable time is performed every predetermined time period.

6. The power supply system of claim 1, further comprising:
input means that inputs a time period,
wherein the loads that can be supplied in the time period input by the input means are displayed.

7. The power supply system of claim 1, further comprising:
input means that inputs a time,
wherein the loads that can be supplied by the time input by the input means are displayed.

8. The power supply system of claim 1, further comprising:
selection means that selects one of the loads which are displayed; and
control means that controls the loads,
wherein, based on the selection by the selection means, the control means controls the selected load.

9. The power supply system of claim 1, wherein at least one of the loads includes two or more devices that require the power.

* * * * *